(12) United States Patent
Okuda (10) Patent No.: US 6,474,551 B2
(45) Date of Patent: *Nov. 5, 2002

(54) IDENTIFICATION CARD READING APPARATUS AND METHOD

(75) Inventor: Osamu Okuda, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/337,036

(22) Filed: Jun. 28, 1999

(65) Prior Publication Data

US 2002/0063151 A1 May 30, 2002

(30) Foreign Application Priority Data

Jul. 1, 1998 (JP) .......................................... 10-186261

(51) Int. Cl.$^7$ ................................................. G06K 5/00
(52) U.S. Cl. ........................ 235/380; 235/382; 235/375
(58) Field of Search ............................. 235/382, 382.5, 235/380, 375

(56) References Cited

U.S. PATENT DOCUMENTS

| | | | | |
|---|---|---|---|---|
| 5,095,196 A | * | 3/1992 | Miyata | 235/382 |
| 5,550,359 A | * | 8/1996 | Bennett | 235/382 |
| 5,629,508 A | * | 5/1997 | Findley, Jr. et al. | 235/380 X |
| 5,754,675 A | | 5/1998 | Valadier | 382/115 |

FOREIGN PATENT DOCUMENTS

| | | |
|---|---|---|
| EP | 0 599 558 | 6/1994 |
| GB | 2 316 908 | 3/1998 |

* cited by examiner

Primary Examiner—Karl D. Frech
(74) Attorney, Agent, or Firm—Fitzpatrick, Cella, Harper & Scinto

(57) ABSTRACT

A card reading apparatus is used in an identification card system for identifying a card holder utilizing identification information recorded on an identification card. The reading apparatus is arranged to reproduce identification information recorded on the card. A display displays the reproduced identification information. After the card is discharged from the apparatus, the display is arranged to continue to display the reproduced identification information to enable the information to be checked against information printed on the card.

19 Claims, 6 Drawing Sheets

IDENTIFICATION CARD READING APPARATUS AND METHOD

BACKGROUND OF THE INVENTION

1. Field of the Invention

This invention relates to an identification card reading apparatus for use in an identification card system in which a person using the card is identified by information recorded on the card, and a method of using such an apparatus.

2. Description of Related Art

Known card-type information recording media include magnetic cards, IC cards, and optical cards.

A magnetic card has a magnetic recording portion on or from which information may be magnetically recorded or reproduced. The recording capacity of a magnetic card is about several dozen bits. Magnetic cards are presently widely used because they are cheap and convenient.

However, magnetic cards have some problems such as low security as they are easy to forge. These problems recently have become a social problem.

Identification cards which have high security are now drawing public attention. In general, IC cards have an IC portion in which is embedded a CPU, ROM, RAM or EEPROM which is electrically erasable. It is thus possible to electrically record and/or reproduce the information. The memory capacity of an IC card is about 8K bytes. Although an IC card is more expensive than a magnetic card, it is expected to become popular because of its higher security.

Optical cards have an optical recording portion enabling the information to be optically recorded and/or reproduced. In spite of being a write-once-type medium from which the recorded information cannot be erased, it is thought to have a wide range of applications because it has a very large memory capacity, typically about several mega bytes, and is cheap.

Because an optical card is very portable and the memory capacity is large, it can be used as an identification card. When the optical card is used as an identification card, the optical card is printed with identification information, such as the name of the card owner, a picture of the face of the card owner, etc., on the surface of the card opposite to the surface on which is embedded the optical recording portion. Digital information corresponding to the identification information is recorded in the optical recording portion. It is thus possible to indicate on the display of a reading apparatus for reproducing information from the card, the identification information recorded on the optical card.

Where a picture is recorded as digital data, if the image size is 80 dots wide and 80 dots long with the image in a bit map form, a recording area of about 18K bytes must be used. Such an amount of information is impossible to record in current magnetic recording media. As a result, an optical card is most suitable for use as an identification card.

Recently, as a result of attention to the larger memory capacity of optical cards and to the higher security of IC cards, an optical-IC card in which is embedded both an optical recording portion and an IC portion has been developed.

In a conventional system, an identification card recorded with identification information including a representation of the face of the card holder is inserted in a reading apparatus, and a picture of the face of the card holder appears on a display screen. When the card is removed from the apparatus, the picture disappears from the screen and the screen gives instructions for the insertion of the next card.

Although identification is possible by comparing a picture of the face of the card holder printed on the card with the actual card holder, it is not possible to trust this because it is easy to forge the picture printed on the card. On the other hand, an optical card is very difficult to forge because if the information on the optical card is rewritten, a vestige of the original information remains on the optical card.

Therefore, identification is preferably carried out by comparing the face of the card holder, the picture of the face printed on the card, and the picture of the face shown on the display. By this method, it is possible to determine whether the picture printed on the card is forged. As a result, it is possible to make an identification card system having very high security.

However, in such a conventional system, when an official identifies the card holder, because the optical card is inserted inside the reading apparatus, the official cannot compare the picture of a face printed on the optical card with the face of the card holder. Also, if the official discharges the optical card from the apparatus, because the display is generally rewritten with a message, for example, instructing the next user to insert a card, the official cannot compare the face of the card holder, the picture printed on the card, and the picture shown on the display at the same time.

SUMMARY OF THE INVENTION

It is an object of the invention to at least alleviate the above problem. In particular, an object is to supply an identification card reader for use in an identification card system in which in appropriate cases it is possible to check the face of the card holder against the picture printed on the card and the picture shown on a display based on information recorded on the card at the same time.

According to the present invention, there is provided an identification card reader for use in an identification card system in which a card holder is identified utilizing identification information recorded on a card, comprising:

means for reproducing the recorded identification information;

a display means for producing a visual indication of the reproduced identification information; and a discharging mechanism for discharging the identification card from the card reader. Furthermore, after the card is discharged from the card reader, the display is arranged to continue to display at least part of the indication of the reproduced identification information.

BRIEF DESCRIPTION OF THE DRAWINGS

An embodiment of the invention will now be described, by way of example only, with reference to the accompanying drawings in which.

DETAILED DESCRIPTION OF THE INVENTION

An embodiment of the present invention will now be explained with reference to the drawings.

Figure 1:
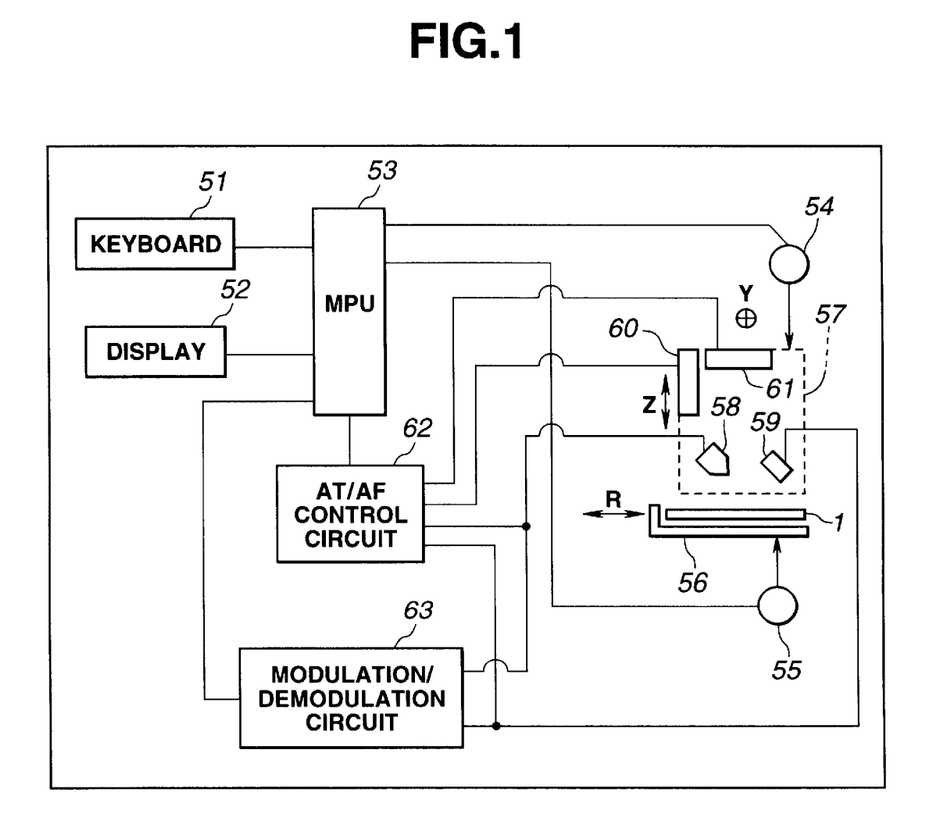
FIG. 1 illustrates the structure of an identification system including an identification card reader in accordance with an embodiment of the present invention.

FIG. 1 shows the structure of an identification card system. The system comprises of a reproducing or reading apparatus for reading and displaying information stored on an identification card 1. The apparatus includes a keyboard 51 for operating the apparatus and a display 52 having, for example, a liquid crystal display screen for indicating how to operate the apparatus and also for displaying information reproduced from the card 1. The display 52 further includes a RAM for storing the information to be displayed for reasons which will be explained later in a further description of the reading apparatus.

Figure 2:
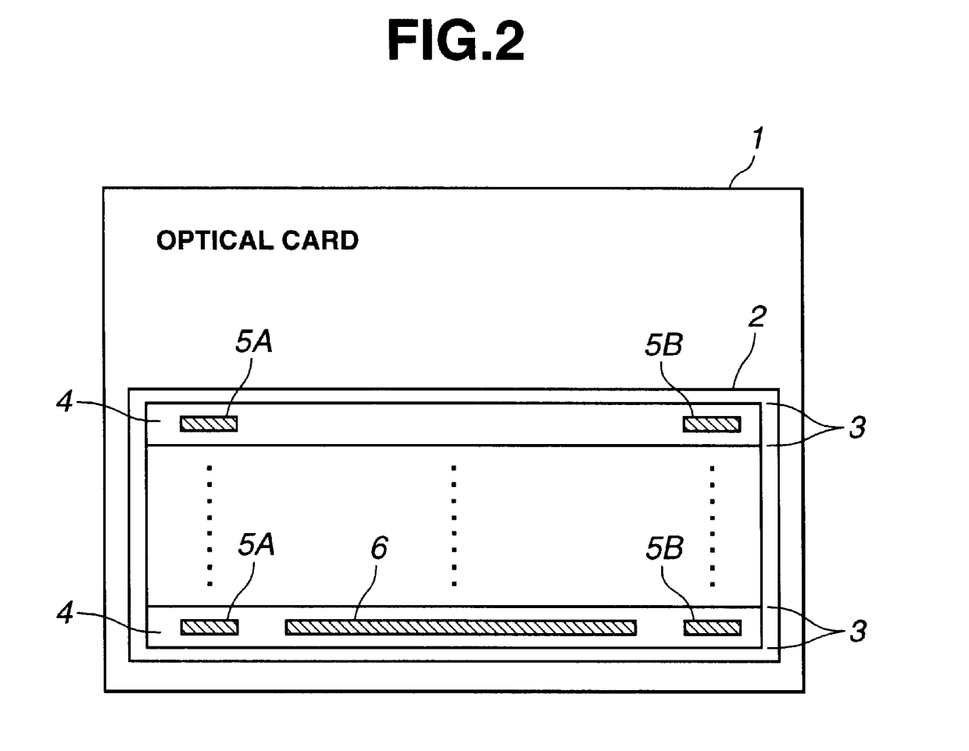
FIG. 2 illustrates an example of an optical card used in the system of FIG. 1.

FIG. 2 is a plan view of one example of an identification card which may be used in the system.

The identification card 1 is an optical card in which is embedded a write-once-type optical recording portion 2 which cannot be erased or rewritten. The optical recording portion 2 has on it a plurality of parallel tracking tracks 3 and information tracks 4 for retaining recorded information and positioned between the tracking tracks 3. Physical track numbers 5A, 5B are provided at both ends of each information track 4 for distinguishing each information track 4. In general, data 6 is recorded on the information track 4 in sectors. The data on the optical card will normally be managed in blocks within files.

Figure 3:
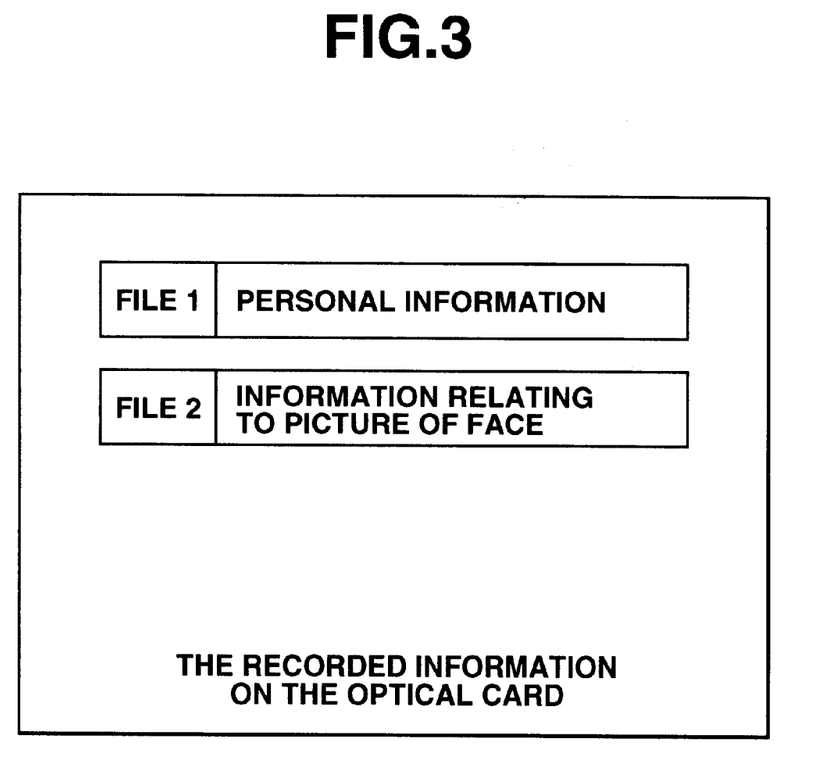
FIG. 3 illustrates the layout of the information recorded on the optical card used in the system of FIG. 1.

FIG. 3 illustrates the layout of the information recorded on the optical recording portion 2 of the optical card 1. File 1 is a file in which is recorded personal information such as the name of the card owner, address, etc. File 2 is a file in which is recorded image information corresponding to a picture of the face of the card owner.

Figure 4:
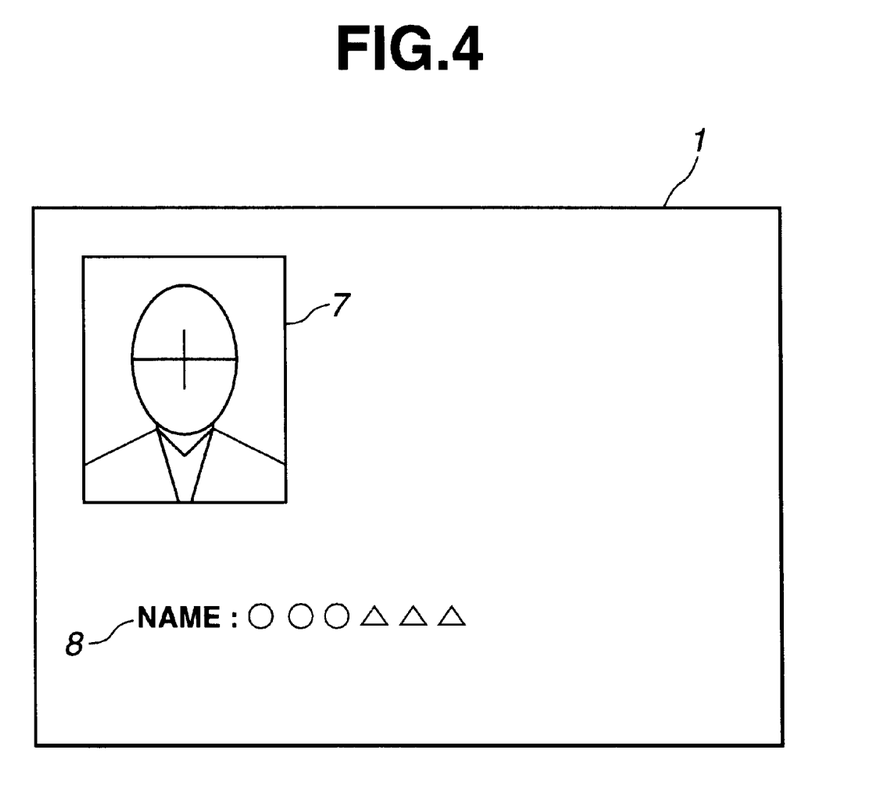
FIG. 4 illustrates the contents printed on the back surface of the optical card used in the system of FIG. 1.

Referring now to FIG. 4 which illustrates the back surface of the card, the surface opposite to the optical recording portion 2, the same information as in File 1, File 2, that is, the picture 7 of the card owner and the name 8 of the card owner, is printed on the back surface. Although FIG. 3 shows File 1, File 2 as the information stored on the optical card 1, it is possible to record other information dependent on the use of the system.

The reading apparatus will now be explained in detail.

Referring now again to FIG. 1, a processor circuit MPU 53 including a ROM and RAM is arranged to control each part of the apparatus. In particular, the MPU 53 controls an optical head conveyor motor 54 and a card conveyor motor 55, and is arranged to detect information input from keyboard 51 and to control the display 52 so that image information and the character information is shown on the screen of the display 52.

The card conveyor motor 55 drives the conveyor mechanism (not shown), which conveys the optical card 1 after insertion into the apparatus onto a tray 56 provided at a predetermined position in the apparatus to enable the information on the card to be read by an optical head 57. Subsequently the conveyor motor 55 causes reciprocal movement of the tray 56 in the direction indicated as R in the drawing, so as to discharge the optical card 1 outside the apparatus.

The reproduction of information from the card 1 by means of the optical head 57 will now be described in detail.

The optical head 57 includes an optical system 58, an optical detector 59, AF actuator 60 and AT actuator 61. The optical system 58 includes a semiconductor laser for producing a light beam which is condensed by a lens arrangement to produce a small light spot on the optical recording portion 2 on the optical card 1. An AT/AF control circuit 62, under the control of MPU 53, controls the AT actuator 61 and the AF actuator 60 on the basis of the output signal from the optical detector 59 and performs AT and AF control. The light spot on the card 1 produced by the optical system 58 thus moves to the information track 4 and is focused on the optical recording portion 2 as will now be described.

The detector 59 detects the reflected light beam from the optical recording portion 2 of the optical card 1. The AF actuator 60 performs AF control by adjusting the focus position of the light spot on the optical recording portion 2 in the Z direction indicated in the drawing (that is, the direction perpendicular to the plane of the card), by moving part of the optical system 58, typically the focusing lens (not shown). The AT actuator 61 performs AT control by adjusting the position of the light spot on the optical recording portion 2 in the Y direction (that is, the direction orthogonal to the information track in the plane of the card 1), by moving a part of the optical system 58. The head conveyor motor 54 is arranged to convey the optical head 57 in the Y direction to move the light spot to a target track on the optical card 1.

In the reading process, the light beam from the optical system 58 irradiates the optical recording portion of the card, and the reflected (or transmitted) beam from the optical recording portion 2 on the card 1 is detected by the detector 59, the output signal from the detector 59 being demodulated by the demodulation circuit 63 acting under the control of the MPU 53. The demodulated information is transmitted to the MPU 53.

When MPU 53 instructs the display 52 to display information, MPU 53 arranges for data representative of the displayed information to be stored in the RAM embedded in the MPU 53 to be transmitted to the display 52. The data transmitted to the display 52 is also stored in a RAM provided in the display 52 and is displayed on a screen of the display 52. Accordingly, unless the information in the RAM provided in the display 52 is rewritten, the display of the information on the liquid crystal display screen persists. The display screen may also display an indication of the data stored beforehand in the ROM inside the MPU 53, and an indication of data read out from the optical card 1.

Next, the specific operation of this embodiment will be explained with reference to the flow chart of FIG. 5.

Figure 5:
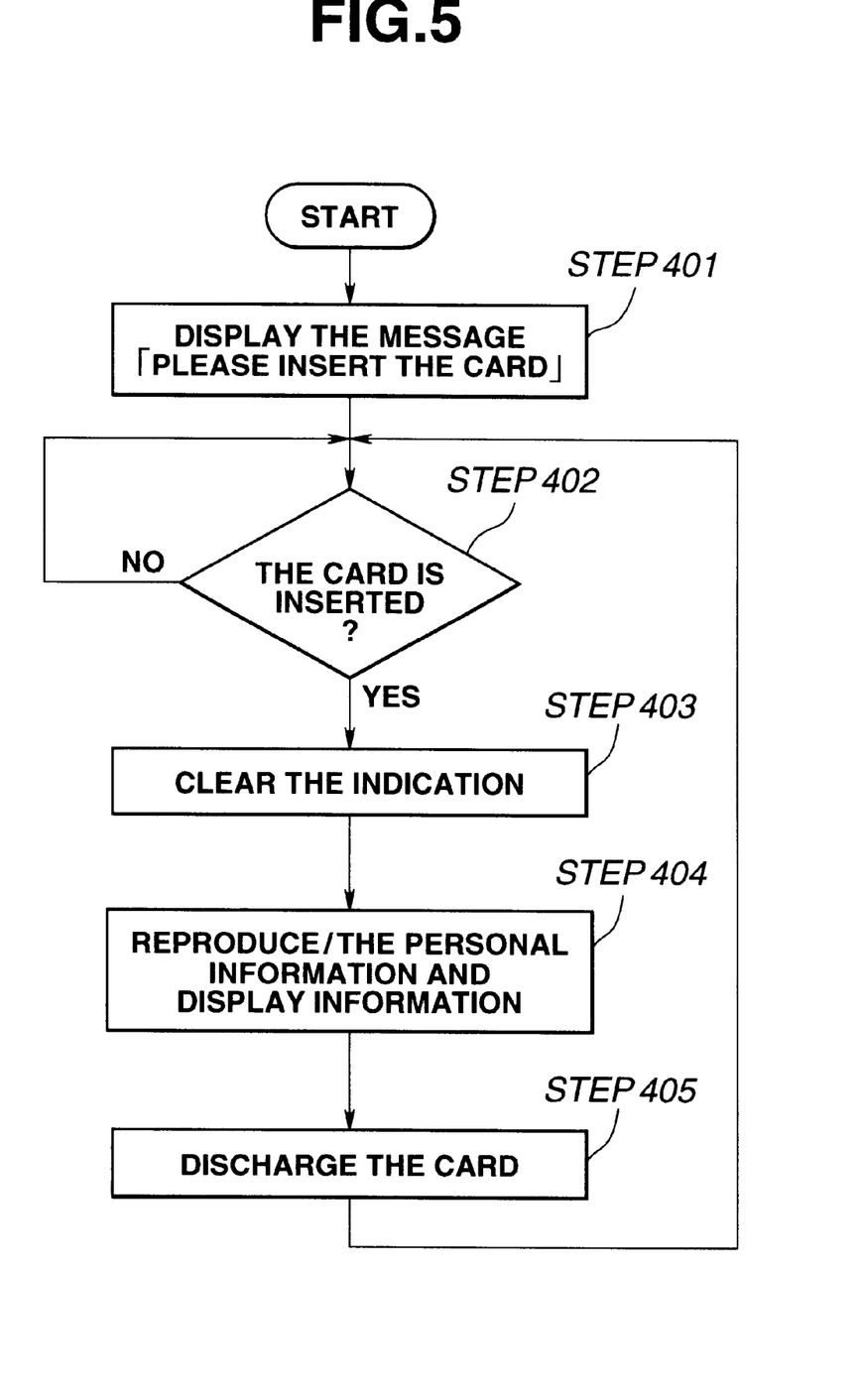
FIG. 5 is a flow chart for explaining the operation of the embodiment in FIG. 1.

In FIG. 5, when the apparatus is in a standby mode, MPU 53 transmits data stored in ROM inside MPU 53 to the RAM provided in the display 52, the display 52 displaying the message:

<Please insert the card> for instructing the user to insert a card into the apparatus (step 401). In this condition, the system remains on standby until the optical card 1 is inserted into the apparatus (step 402).

When the optical card 1 is inserted, MPU 53 causes the data stored in the RAM provided in the display 52 to be erased and the message asking the user to insert the optical card 1 to be cleared from the screen of the display (step 403).

Next, MPU 53 controls each portion of the reading apparatus so that the light beam accesses File 1, File 2 on the recording portion of the card 1, and the information recorded in File 1 and File 2 is reproduced by the light beam (step 404). Also, MPU 53 arranges for the reproduced information to be transmitted to the RAM provided in the display 52, the display screen displaying the information of the File 1 and the File 2.

Figure 6:
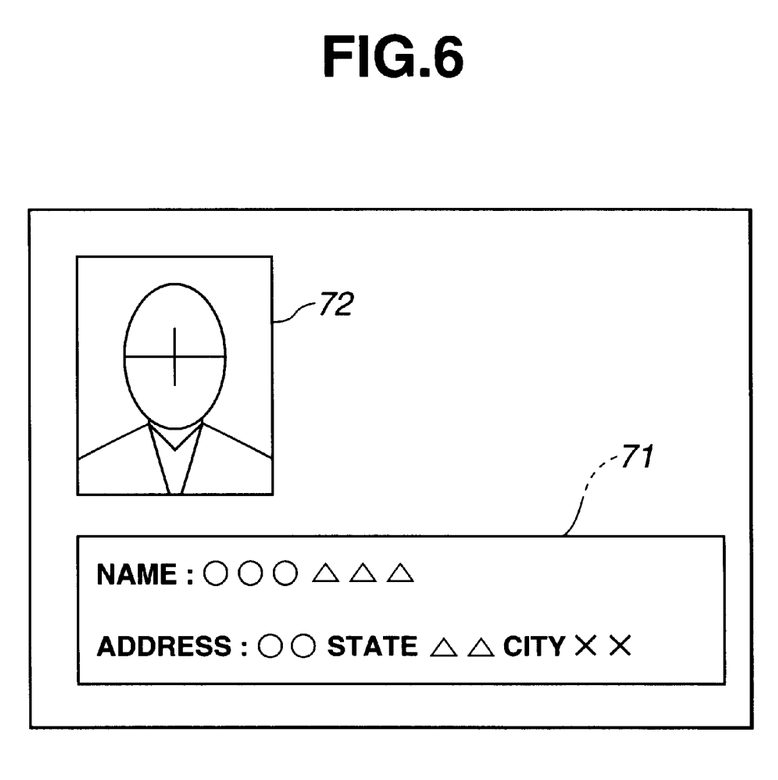
FIG. 6 illustrates the contents of the display in the system of FIG. 1.

FIG. 6 illustrates the information displayed on the screen of the display 52. The personal information, that is the name and address recorded in File 1 on the card, is indicated by 71. The image information, that is the picture of the face recorded in the File 2, is indicated by 72.

In order to discharge the card 1 from the apparatus, the user operates the keyboard 51 to make the system issue a discharge command for the optical card 1. When MPU 53 receives the discharge command, MPU 53 controls the card conveyor motor 55 to discharge the optical card 1 from the reproducing apparatus (step 405). After the optical card 1 has been discharged, the system returns to step 402, with the system on standby until the next insertion of an optical card.

In this embodiment, the information in File 1 and File 2 is kept in the RAM provided in the display 52 after discharge of the optical card 1. The name and image of the face picture persists on the liquid crystal colour display 52 as indicated in FIG. 5. Accordingly, after the optical card 1 has been discharged from the apparatus, it is possible to identify the user by checking the personal information in the form of the name and the address, the picture of the face indicated on the display screen 52, and the personal information in the form of the name and the address, and the picture printed on the back surface of the optical card 1, together with the face of the card holder at the same time. Examples of use of the system are as an entry system, a credit card system, etc.

The reading apparatus may be replaced by a recording/reading apparatus which additionally performs recording of information on the card. The card will then be of the type including an optical recording portion suitable for recording further information.

It will be appreciated that the recording card 1 may alternatively or additionally be provided with an IC portion in order to increase the security of the card. Furthermore, the card may alternatively or additionally include a magnetic recording portion.

What I claim is:

1. A card reading apparatus for use in an identification card system for identifying a card holder utilizing identification information on a card including identification information recorded on a recording area of the card, said apparatus comprising:

a reproducing apparatus for providing reproduced information by reproducing the identification information recorded on the recording area;

a display for displaying a representation of the reproduced information, said display having a memory for storing the reproduced information; and a discharging mechanism for discharging the card outside of said card reading apparatus, wherein after the card is discharged outside of said card reading apparatus, said display continues to display a representation of at least some of the reproduced information.

2. A card reading apparatus according to claim 1, wherein the identification information includes a picture of the card holder.

3. A card reading apparatus according to claim 1, wherein the identification information includes the name of the card owner.

4. A card reading apparatus according to claim 1, wherein the card includes an optical recording portion.

5. A card reading apparatus according to claim 4, wherein the card is write-once-type.

6. A card reading apparatus according to claim 1, wherein the card includes an IC.

7. A card reading apparatus according to claim 1, wherein the card includes a magnetic recording medium.

8. A card reading apparatus according to claim 1, wherein said display is arranged to continue to display a representation of the reproduced information until another card is inserted into said card reading apparatus.

9. A card reading apparatus according to any one of the preceding claims in which the card includes a visual image of the card holder.

10. A method of identifying a cardholder having an identification card on which identification information is recorded, the method comprising the steps of:

using a card reading apparatus to provide reproduced information by reproducing the identification information recorded on the card;

displaying a representation of the reproduced information on a display;

storing the reproduced information using a memory;

discharging the card outside the card reading apparatus; and continuing to display a representation of at least some of the reproduced information on the display after discharge of the card from the reading apparatus, in which the display of a representation of at least some of the reproduced information continues until another card is inserted into the card reading apparatus.

11. A system for identifying a card holder utilizing identification information on a card including identification information recorded on the recording area of the card, said system comprising:

a reproducing apparatus for providing reproduced information by reproducing the identification information recorded on the recording area;

a memory for storing the reproduced information;

a display for displaying a representation of the reproduced information; and a discharging mechanism for discharging the card, wherein after the card is discharged said display continues to display a representation of at least some of the reproduced information.

12. A system according to claim 11, wherein the identification information includes a picture of the card holder.

13. A system according to claim 11, wherein the identification information includes the name of the card owner.

14. A system according to claim 11, wherein the card includes an optical recording portion.

15. A system according to claim 11, wherein the card is write-once-type.

16. A system according to claim 11, wherein the card includes an IC.

17. A system according to claim 11, wherein the card includes a magnetic recording medium.

18. A system according to claim 11, wherein said display is arranged to continue to display a representation of the reproduced information until another card is inserted into the system.

19. A system according to claim 11, in which the card includes a visual image of the card holder.

* * * * *

UNITED STATES PATENT AND TRADEMARK OFFICE
CERTIFICATE OF CORRECTION

PATENT NO.   : 6,474,551 B2
DATED        : November 5, 2002
INVENTOR(S)  : Osamu Okuda It is certified that error appears in the above-identified patent and that said Letters Patent is hereby corrected as shown below:

<u>Column 3,</u>
Line 41, "as" should read -- has --.

Signed and Sealed this

First Day of July, 2003

JAMES E. ROGAN
*Director of the United States Patent and Trademark Office*